(12) United States Patent
Soloff

(10) Patent No.: US 6,889,384 B1
(45) Date of Patent: May 3, 2005

(54) SIMPLIFIED INTERACTIVE USER INTERFACE FOR MULTI-VIDEO CHANNEL NAVIGATION

(75) Inventor: Steven Soloff, Tamarac, FL (US)

(73) Assignee: The DIRECTV Group, Inc., El Segundo, CA (US)

( * ) Notice: Subject to any disclaimer, the term of this patent is extended or adjusted under 35 U.S.C. 154(b) by 418 days.

(21) Appl. No.: 09/709,835

(22) Filed: Nov. 8, 2000

(51) Int. Cl.$^7$ .............................................. H04N 7/173
(52) U.S. Cl. ...................................................... 725/105
(58) Field of Search .......................... ; 725/105, 37–38; 348/143, 14.01–14.05, 14.08–14.16; H04N 7/173

(56) References Cited

U.S. PATENT DOCUMENTS

| | | | |
|---|---|---|---|
| 5,157,491 A | * 10/1992 | Kassatly | 348/14.08 |
| 5,410,344 A | * 4/1995 | Graves et al. | 725/46 |
| 5,557,724 A | * 9/1996 | Sampat et al. | 725/43 |
| 5,563,648 A | 10/1996 | Menand et al. | 348/13 |
| 5,594,935 A | * 1/1997 | Reber et al. | 725/2 |
| 5,714,997 A | * 2/1998 | Anderson | 348/39 |
| 5,724,091 A | * 3/1998 | Freeman et al. | 725/138 |
| 5,819,034 A | 10/1998 | Joseph et al. | 395/200 |
| 5,861,881 A | * 1/1999 | Freeman et al. | 715/500.1 |
| 6,101,536 A | * 8/2000 | Kotani et al. | 709/217 |
| 6,470,498 B1 | * 10/2002 | Reber et al. | 725/139 |
| 6,499,027 B1 | * 12/2002 | Weinberger | 707/4 |
| 6,504,990 B1 | * 1/2003 | Abecassis | 386/46 |
| 6,680,746 B2 | * 1/2004 | Kawai et al. | 348/14.09 |
| 2001/0019360 A1 | * 9/2001 | Tanaka et al. | 348/14.03 |
| 2002/0069411 A1 | * 6/2002 | Rainville et al. | 725/37 |
| 2002/0188943 A1 | * 12/2002 | Freeman et al. | 725/38 |

* cited by examiner

*Primary Examiner*—Young Lee
(74) *Attorney, Agent, or Firm*—Georgann S. Grupebach

(57) ABSTRACT

A system and method that provides satellite television users with a simple interface in which to choose from a variety of video images representing a different camera angle at a given event. The invention comprises a plurality of cameras positioned at a certain event, such as a sporting event. The video images from the cameras are broadcast to one or more satellites, which downlink the images to a central broadcast center. At the central broadcast center, information relating to the event is bundled with the video images and re-broadcast to a second set of satellites. The information and video images are then downlinked to multiple users situated within the satellite's footprint, to be viewed on their televisions. The user interface includes a remote control device, and a transparent bar, a navigational key display, and a textual description of the current camera angle being viewed all superimposed upon the television screen, thereby allowing the user, via the remote control device, to simply select from a camera angle, navigate to other camera angles, and receive a stream of information about the viewed event.

14 Claims, 7 Drawing Sheets

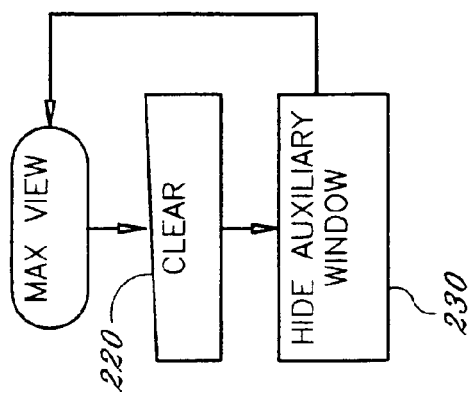
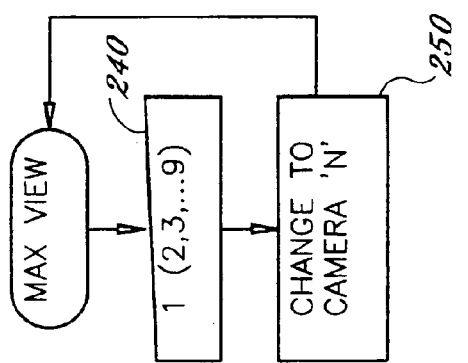
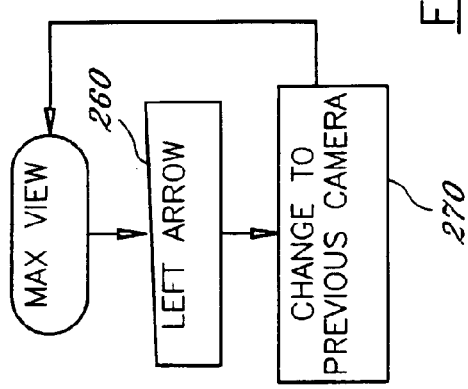
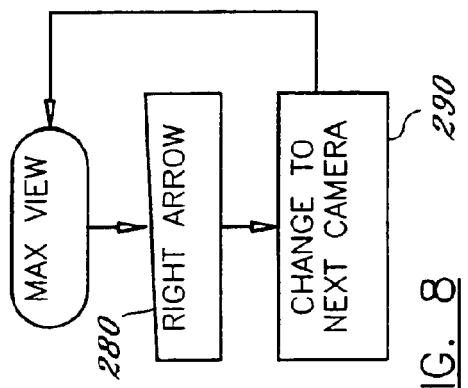
FIG. 8
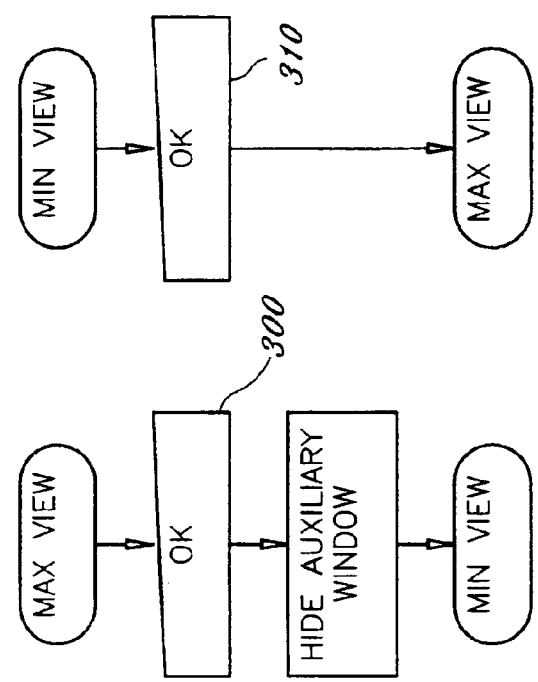
FIG. 9

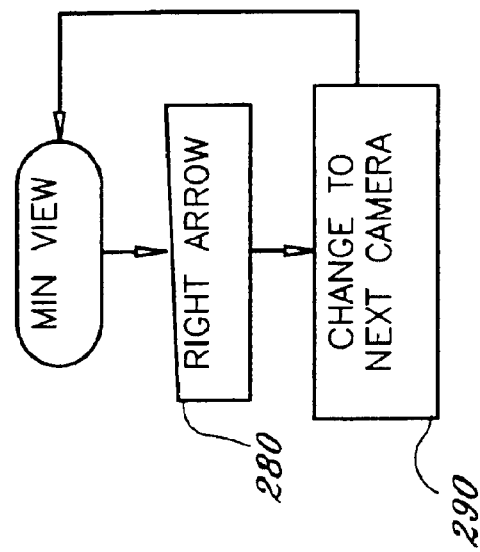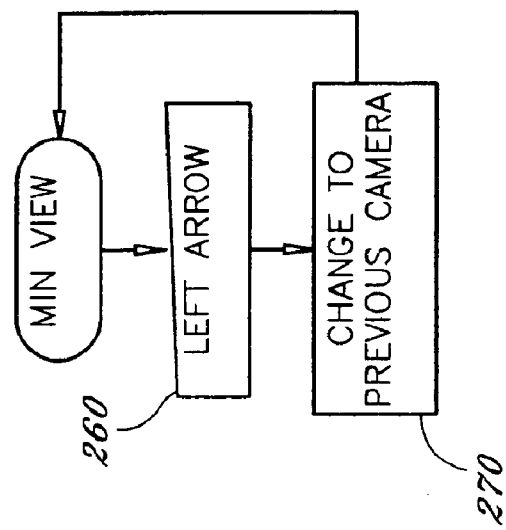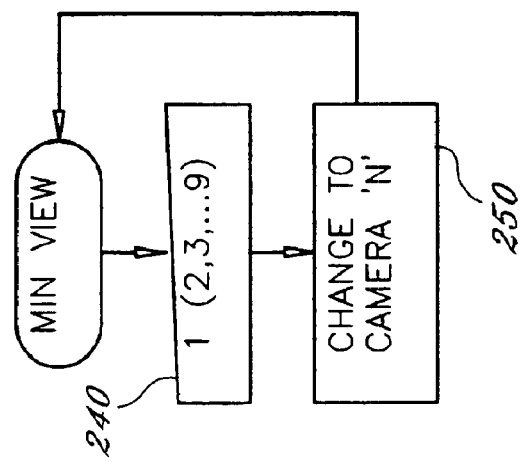
FIG. 10

SIMPLIFIED INTERACTIVE USER INTERFACE FOR MULTI-VIDEO CHANNEL NAVIGATION

BACKGROUND OF THE INVENTION

1. Field of the Invention

The invention generally relates to a method and system of providing a user with an easy-to-manipulate multiple video channel interface in order to view a satellite-broadcast event, from a variety of different camera angles presented on a plurality of video channels.

2. Description of the Prior Art

With the worldwide interest in sporting events, outdoor activities and entertainment events wherein multiple different viewing angles of a single event are desirous, coupled with the exploding satellite-television coverage and technology, television viewers are seeking easier and yet more sophisticated ways of viewing their favorite outdoor action events.

Satellites have had a significant impact on the television industry. With an orbital location so far from earth, satellites transmit a usable signal over a broad footprint. The large geographical coverage of satellites makes it possible to serve thousands, if not millions, with a single satellite.

The basic components of a satellite system are one or more transmitting earth stations, the uplink, the satellite, the downlink, and one or more receiving earth stations. The communications satellite is a radio relay operating in space for ten or more years without the need for on-site servicing or adjustment. Satellites contain transceivers that receive and transmit signals, including video programming, telephone calls and data. They operate in a vacuum at a location exposed to extreme temperature changes.

The production of an outdoor, action, or sporting event for television broadcast typically involves several video cameras, each providing a different viewpoint, placed strategically around the action venue. A single video image selected from one of the camera views is uplinked to one or more communication satellites. It is up to the video event producer to determine which camera view is being uplinked to the satellite at any one time.

Providing multi-video programming of a single event such as as a sports event would greatly enhance the viewers enjoyment of the sports event. A multi-video broadcast using multiple video channels would uplink two or more camera views at the same time, which would allow users to choose which viewing or display angle they wish to view on their television at any moment during the event.

Unfortunately, with the multi-video channel capability, the navigation between the different video channels would be clumsy at best. Users would have to utilize the channel plus (+) and channel minus (−) buttons on their remote control units to navigate through the multiple video perspectives of a single event. They would have to guess and memorize the content of each channel and camera angle. This type of navigation is merely analogous to changing channels completely to view different angles of the event.

Accordingly, what is needed in the art is a system and method for providing an informative, instructive, manageable and interactive user interface in order to allow the user to quickly and intuitively select and view one of a variety of event viewing angles on different channels for a single event.

It is, therefore, to the effective resolution of the aforementioned problems and shortcomings of the prior art that the present invention is directed.

SUMMARY OF THE INVENTION

The present invention is a satellite television multiple view/multiple channel display controller application that provides a non-complex user interface to aid the subscriber in choosing from multiple different displays of a single event, and at any given time select a camera display viewpoint that the subscriber wishes to view.

Specifically, the present invention is a user interface for allowing a user to continuously select from a plurality of video channels, each displaying a different camera view of the same event, a desired camera image from a given satellite television broadcast event at a given venue, comprising a viewing device for viewing the images, such as a television or a PC monitor, wherein the viewing device includes a system-generated video transparent bar display superimposed upon the monitor screen to provide the user with directional navigation instructions, a display of navigation keys, and a textual description of the current camera angle being viewed. The television broadcaster from the single event provides a predetermined number of video channels. Each video channel produces images from a different camera and viewing angle.

Also included are video channel/image selection controls preferably in the form of a remote control for providing a user with a hand-manipulated device for selecting a specific channel from the numerous channels presenting a variety of channel/camera angles for viewing the event and to provide on-screen display event information for user-friendly navigation from the different channel images. Displayed information related to each channel/image viewpoint is provided on the display menu relating to the actual event and camera angle.

In the preferred embodiment, the user interface is incorporated into a DSS terrestrial-satellite communications network having a user interface for viewing multiple camera angles of satellite television broadcast events at a given venue. The network comprises a plurality of cameras situated at a venue for capturing multiple video images of an event from different angles; an uplink transmitter for transmitting the multiple video images from the event on a plurality of video channels; a first set of one or more communication satellites for receiving the transmitted multi-video images and transmitting the images as broadcast signals; a broadcast center having a central network computer for receiving the transmitted broadcast signals; a second set of one or more satellites for receiving the broadcast signals from the broadcast center, the second set of satellites to transmit the broadcast signals to a receiving antenna situated within the satellite's coverage area; a viewing device connected to the antenna; and a remote control device for providing the user with a means of selecting from the multiple video images of the event.

Software is provided to allow the user to view indicia on his or her television screen. The indicia, in conjunction with the remote control device, allow the user to navigate easily from one channel, and hence, camera angle to another. The indicia includes a viewer-selection menu superimposed on the television screen, allowing the user to choose which channel and camera image to view, and to view information about the event and its participants. The user simply presses the remote control key listed next to the menu choice associated with information he or she wishes to view.

In an alternate embodiment, the present invention possesses the capability of transmitting information along with the multiple video images in order to enhance video programming. This information could be general information about the event, such as the overall standings of racers on the driving circuit. The information is bundled along with the video images at the central broadcast center and is included in the uplink to the second set of satellites as a bundled broadcast signal.

In still another application, the information represents dynamically updated data, which can be provided to the subscriber, such as real-time scores, standings and statistics.

In yet another embodiment, the user interface includes an on-screen schematic representation of the event being viewed, indicating where each camera is located at the venue.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

In accordance with these and other objects which will become apparent hereinafter, the instant invention will now be described with particular reference to the accompanying drawings.

BRIEF DESCRIPTION OF THE DRAWINGS

FIG. 8 is a continuation block diagram illustrating the user input flowchart of the present invention.

FIG. 9 is a continuation block diagram illustrating the user input flowchart of the present invention.

FIG. 10 is a continuation block diagram illustrating the user input flowchart of the present invention.

DESCRIPTION OF THE PREFERRED EMBODIMENTS

Figure 1:
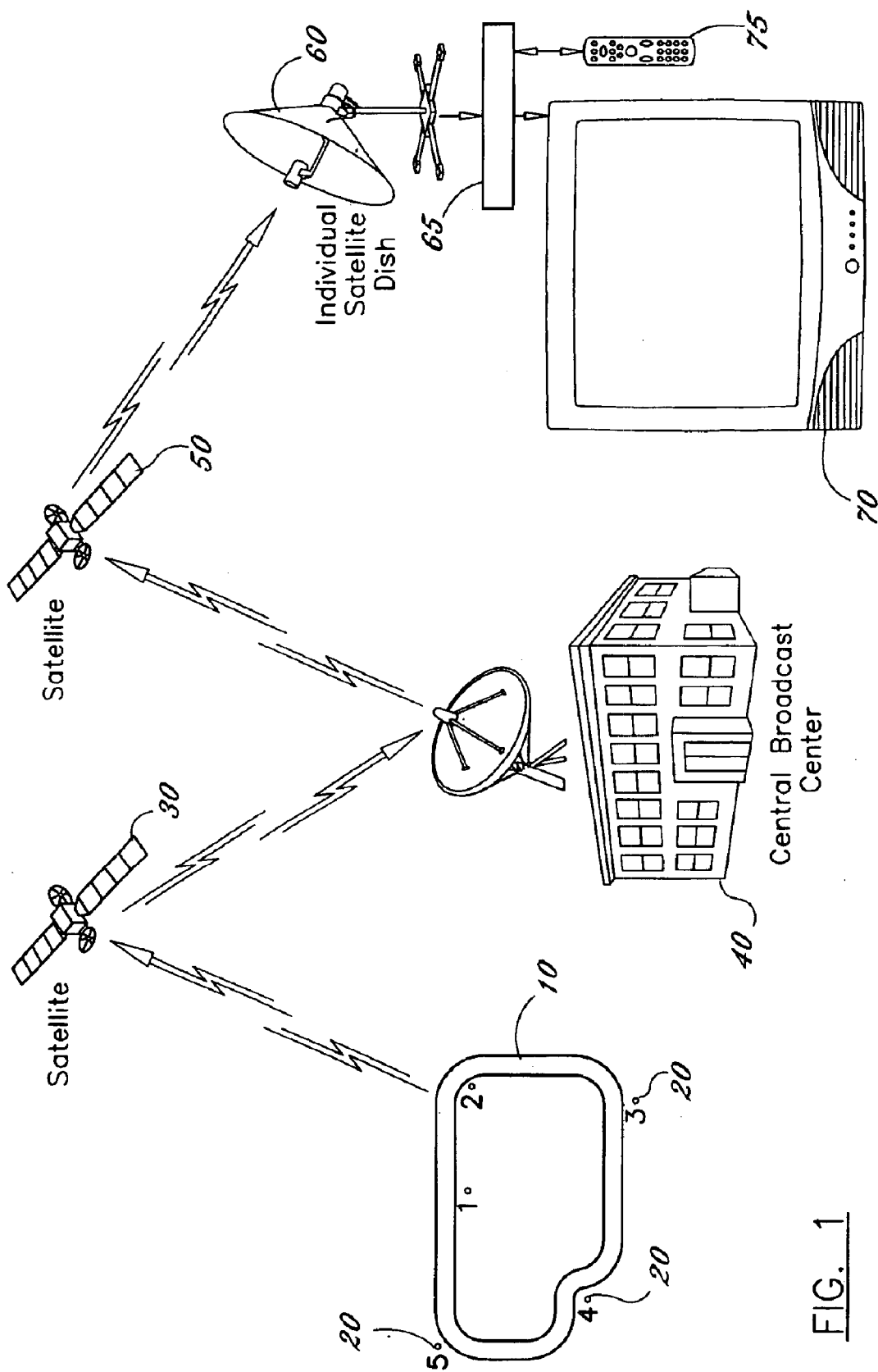
FIG. 1 is a block diagram illustrating the network architecture of the present invention.
Figure 2:
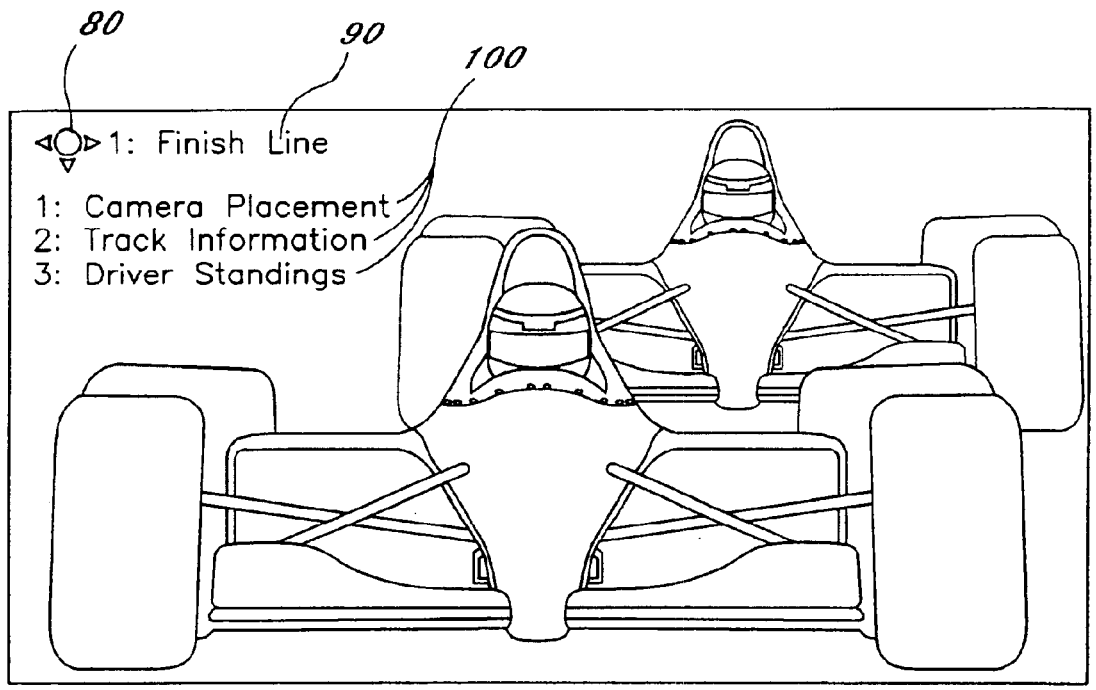
FIG. 2 illustrates another user viewer screen depicting the on-screen instructional panel incorporated into the user interface of the present invention.

Referring to FIG. 1, the system architecture of the present invention is shown.

Multiple cameras 20 are placed at an event 10, such as a sporting event, an outdoor theater performance, or an outdoor political event, to capture action from a variety of different camera angles. FIG. 1 shows event 10. For illustrative purposes, an automobile race is chosen as a typical event. Cameras 20 are positioned at the race in various different locations. An uplink transmitter then broadcasts a plurality of video channels, each channel providing images representing different camera angles captured by the different cameras, to one or more communications satellites 30. The video images are then downlinked, via a second broadcast, to a Central Broadcast Center (CBC) 40. At CBC 40, data comprised of information associated with the sporting event, for example, the names of the racers participating in the race, the models of their cars, and their overall circuit standings, is bundled along with the video images. This bundled information is then broadcast to a second set of one or more communications satellites 50.

The bundled video images and data are then downlinked to receiving antennas 60 situated within the satellites' footprint. Subscribers' televisions or other viewing devices 70, such as a Personal Computer or a PDAS, are connected to receiving antenna 60.

The user can utilize the present invention with a standard remote control device 75 in communication with a set top box 65, i.e. integrated receiver/decoder (IRD). Unlike other multiple-image broadcasts that make it difficult for the user to navigate between multiple different camera angles, the present invention provides an interface to allow the user easy access to each different camera video image through selection of different channels. Preferably, the necessary software needed to generate the video indicia display for each separate channel and camera angle and to utilize the interface can be transmitted to the user in the downlinked broadcast for application in the set top box 65, or provided separately on a CD-ROM, for example.

FIGS. 2–6 illustrate a television screen as seen by a subscriber. The main interface of the application is comprised of a transparent bar that resides on top of the viewing screen. It includes information that guides the user through the camera location choices and transition.

The information includes, from left to right, a schematic 80 of the navigation keys that informs the user which keys are usable on the remote control device 75, a textual description 90 of what image the current camera is showing, and application-defined enumerated values 100 corresponding to different user options.

To scroll from one camera angle to another, the subscriber uses the LEFT and RIGHT arrow keys on the remote control device 75. The user may also press any of the digit keys to go directly to the corresponding camera. As can be seen from FIG. 2, the user can view each numbered location, for example the locations of the different cameras around the track, indicated as selection number (1), information above the racetrack, selection number (2), and the driver's rankings on the circuit, selection number (3).

Pressing the DOWN arrow on the remote control device 75 brings up the application menu. From here the user can access the information that was bundled along with the video information. The UP and DOWN arrow keys are used to change the selection, and the OK button is used to invoke the selection. The corresponding digit key may also be used to select a menu item.

Figure 3:
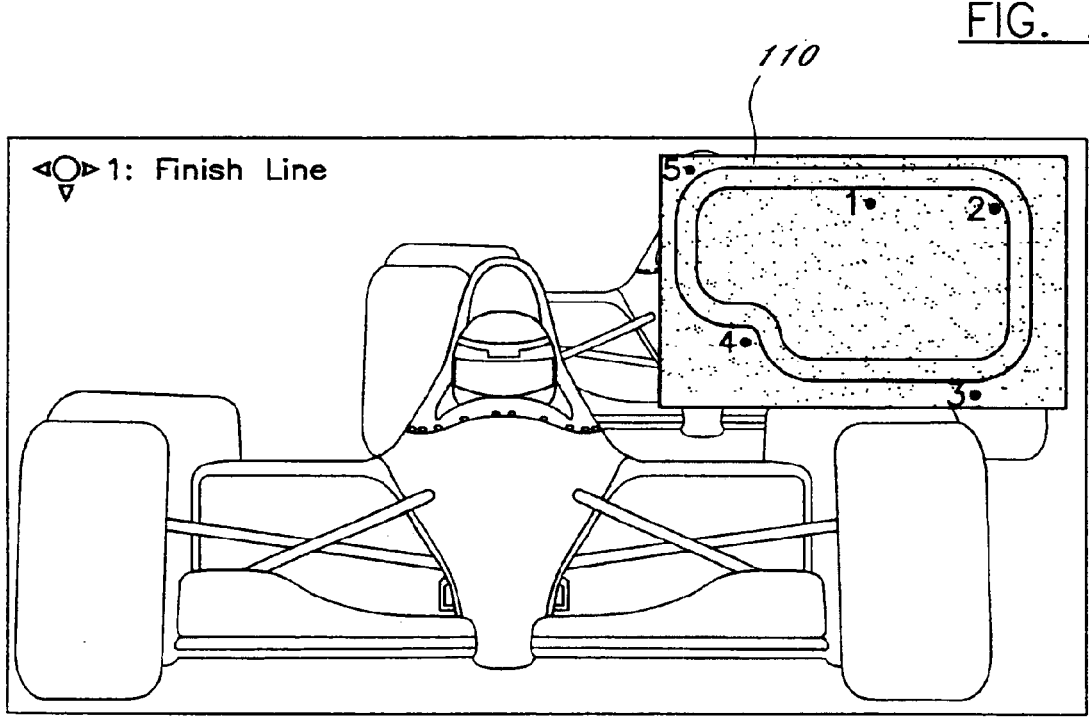
FIG. 3 illustrates another user viewer screen depicting the camera-placement screen of the user interface.

One piece of information that will always be present in the menu is the Camera Placement screen 110, shown in FIG. 3, which allows the subscriber to know where the various cameras are situated within the venue.

A screen representing the current venue is displayed with the camera locations clearly indicated. The numbers next to each camera indicate which key on the remote 75 will take the subscriber directly to that view. The user presses the CLEAR key to close screen 110.

Generally, the event information presented to the user is considered non-changing, or static. Static information is defined as data that will not change during the course of the event. Information describing the features of the event venue or the participants, such as the racetrack, the racecars and their drivers, may be embedded within the video application.

Figure 4:
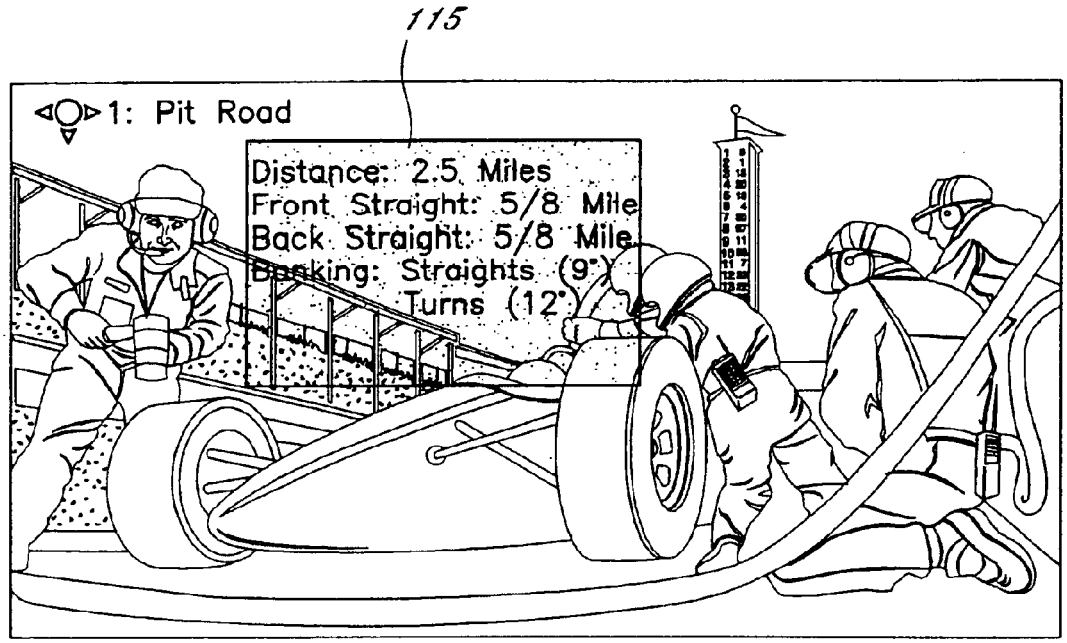
FIG. 4 illustrates another user viewer screen depicting the track information screen of the present invention.

Shown in FIG. 4 is information about the track 115. Here, the camera being viewed has been placed at one of the pit stops. The track information includes information about the length of the race, and the front and back straight-aways. Banking and turn angles are also included. The information shown is merely an example, and virtually any information associated with the event can be included at Central Broadcast Center 40 or other locations, combined with the video signals and transmitted via a bundled broadcast.

Figure 5:
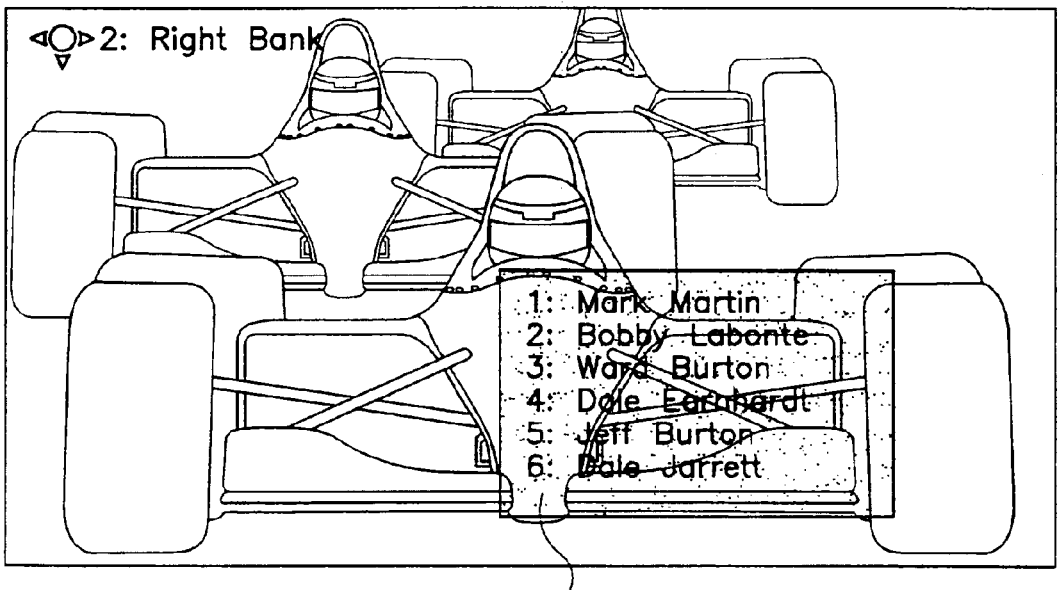
FIG. 5 illustrates another user viewer screen depicting static information appearing on the screen utilizing the user interface of the present invention.

FIG. 5 depicts the race from the right bank of the racetrack. Here, another set of race information can be viewed, such as the current standings of the drivers on the racing circuit 120. The user may close either of these screens by pressing the CLEAR key.

Figure 7:
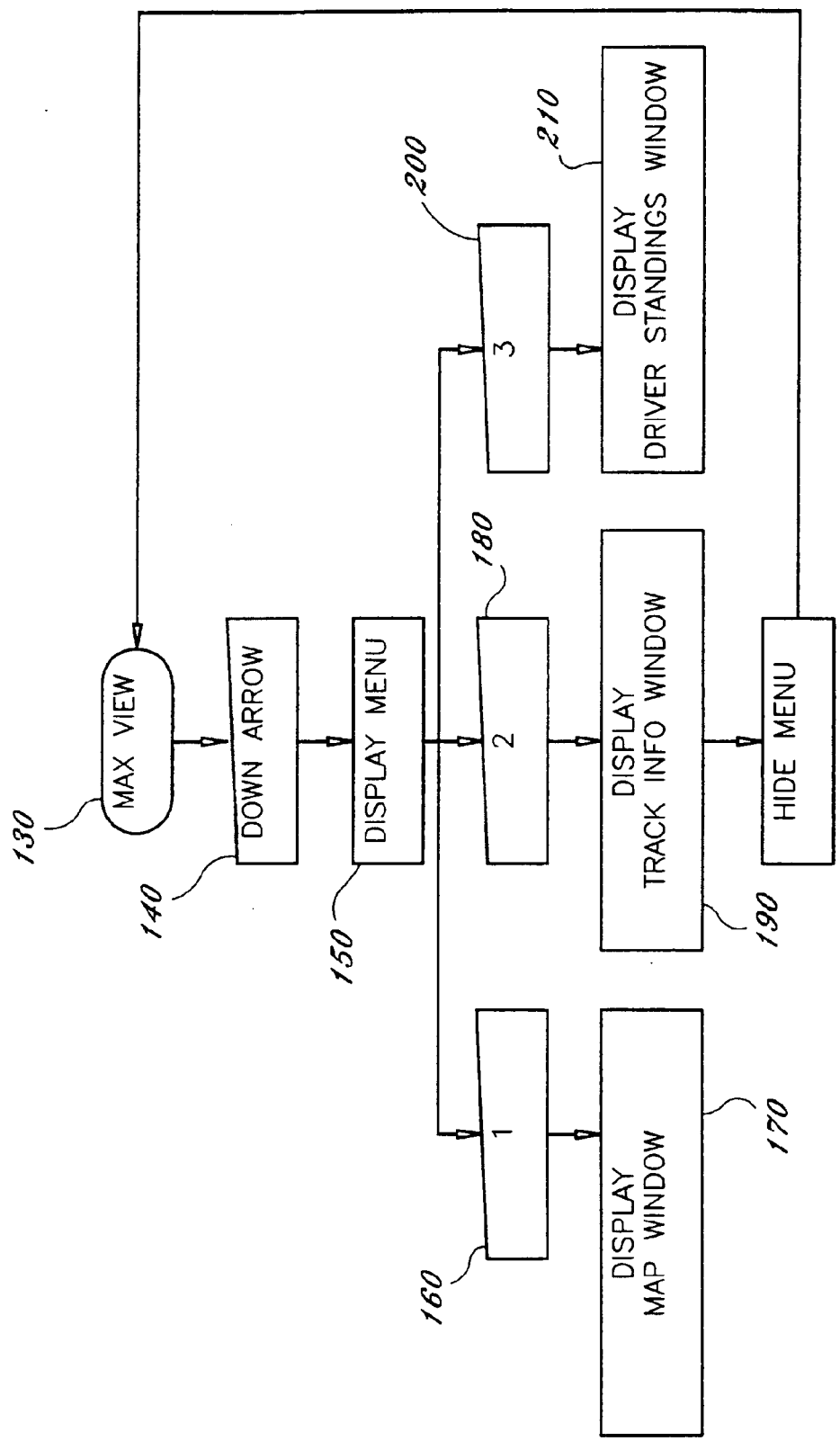
FIG. 7 is a block diagram illustrating the user input flowchart of the present invention.

FIG. 7 illustrates the steps taken by a user when utilizing the on-screen indicia in conjunction with his or her remote control device 75. The maximum screen image 130, represents the screen with the transparent bar across the top, with icons and user instructions. From this screen, the user can press the down arrow on the remote 75 via step 140, to display the menu 150, which then gives the user a variety of viewing options. On the remote 75, the user can strike "1" 160 to display the map window 170; press "2" 180 to display the racetrack information window 190, or press "3" 200 to display the driver's rankings on the circuit 210. Although the numbers (1), (2) and (3) are used in this example, it is within the spirit of the present invention to use any numbers or keys on the remote device 75. It is the combination of the on-screen indicia with a selection device that allows the user to seamlessly navigate between camera angles.

As shown in FIG. 8, by pressing the "CLEAR" button, shown as step 220, any windows that are displaying information are closed, shown as step 230. The user can go directly to a different camera angle, via step 250 by simply pressing the appropriate number 240. The screen image will then switch to the camera angle corresponding to the number chosen, as indicated in step 250. Should the user wish to revert back to the previously viewed camera angle 270, the left arrow is depressed on the remote device 75, as indicated by step 260. Depressing the right arrow 280 advances to the camera angle associated with the next higher camera number 290.

Figure 6:
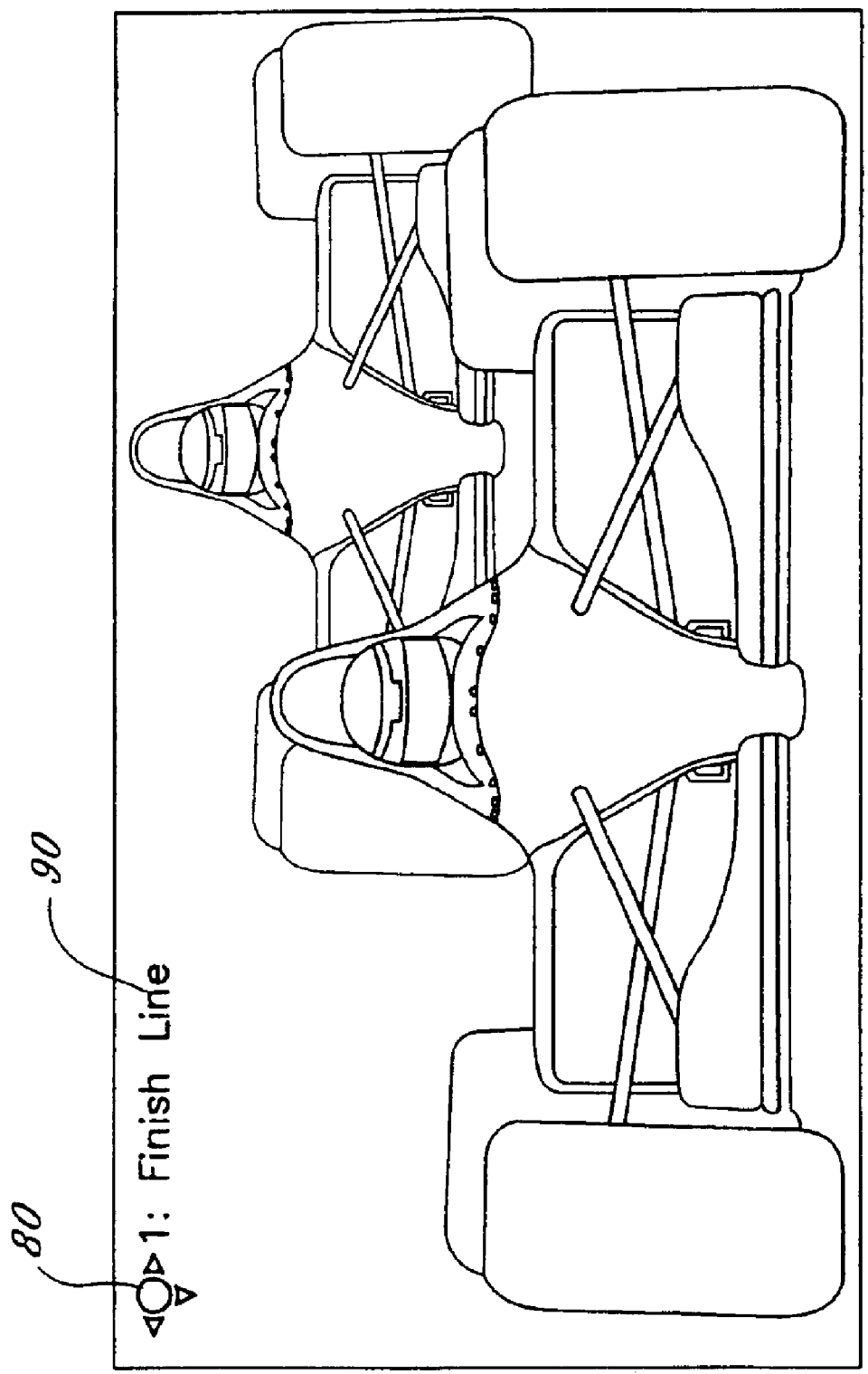
FIG. 6 illustrates another user viewer screen depicting the user interface of the present invention.

It is envisioned that after an hour of using the present invention, the subscriber will become so familiar with the camera views and their corresponding enumerated values, that they will begin to be able to activate new video angles without the on-screen instructions since it obscures some of the view. A typical screen in this mode is shown in FIG. 6.

As shown in FIG. 9, the user can enter Expert Mode by pressing the "OK" key, shown as step 300. When this occurs, the only navigation key icon is on the screen. When the user changes cameras angles, the camera text appears and then disappears after 5 seconds. Striking the "OK" key again returns the user to the maximum, or normal view, as shown by step 310.

FIG. 10 shows the steps the user would take to toggle between camera angles from "Expert Mode", that is without any visible instructions on the screen.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A DSS terrestrial-satellite communications network for viewing multiple camera angles, said network comprising: a user interface for said camera angles, wherein said camera angles display a single satellite television broadcast event transmitted over multiple video channels, each video channel providing a different camera angle display at a given venue;

a plurality of cameras situated at the venue for capturing multiple video images of said single event, each said video, image representing a different said camera angle display from the event;

an uplink transmitter transmitting said multiple video images from said event on a plurality of the video channels;

a first set of one or more communication satellites for receiving said multiple video images and transmitting said images as broadcast signals;

a broadcast center for receiving said transmit broadcast signals;

a second act of one or more satellites for receiving said broadcast signals from said broadcast center, said second set of satellites to transmit said broadcast signals to user receiving means situated within said satellites coverage area;

a set top box connected to said receiving means;

a viewing device connected to said set top box, said viewing device including a video transparent bar display superimposed upon a screen to provide the user with directional navigation instructions, a display of navigation keys and a textual description of the current camera angle being viewed including application-defined enumerated values, said viewing device further including a dynamic on screen schematic representation of the event, wherein the on screen schematic representation indicates where each camera is located at the venue; and video image selection means for providing a user with a means of continuously selecting from said multiple video images of said event.

2. The network of claim 1 wherein said broadcast signals further comprise information bundled with said multiple video images.

3. The network of claim 2 wherein said information is comprised of data about the event and does not change as the event progresses.

4. The network of claim 3 further comprising means for viewing said information.

5. The network of claim 2 wherein said information is comprised of dynamically updated data about the event and changes as the event progresses.

6. The network of claim 5 further comprising means for viewing said information.

7. The network of claim 2 wherein said video image selection means comprises a remote control device.

8. A method of providing a user with multiple camera views comprising the steps of:

providing a plurality of cameras at a venue for capturing multiple video images of single, multiple video channel satellite-broadcast event, each said video image representing a different camera angle display from the event;

transmitting said multiple video images from said event on a plurality of video channels;

providing a first set of one or more communication satellites for receiving said multiple video images and transmitting said images as broadcast signals to a broadcast center;

providing a second set of one or more satellites for receiving said broadcast signals from said broadcast center, said second set of satellites to transmit said broadcast signals to user receiving means situated within said satellites coverage area;

providing a viewing device connected to said receiving means, said viewing device further including on-screen viewing indicia to facilitate navigation between said camera angle displays;

utilizing said on-screen video indicia to coordinate selection of one of the multiple camera views, said on-screen indicia comprising a transparent bar, a navigational key display to provide the user with directional navigation instructions, and a textual description of the current camera angle being viewed including application-defined enumerated values said viewing device further including a dynamic on screen schematic representation of the event, wherein on screen schematic representation indicates where each camera is located at the venue, all superimposed upon said viewing device; and providing video image selection means for allowing a user to select an image from said multiple video images of said event.

9. The method of claim 8 wherein said broadcast signals further comprise information bundled with said multiple video images.

10. The method of claim 9 wherein said information is comprised of static data about the event and does not change as the event progresses.

11. The method of claim 10 further comprising the step of viewing said information.

12. The method of claim 9 wherein said information is comprised of dynamically updated data about the event and changes as the event progresses.

13. The method of claim 12 further comprising the step of viewing said information.

14. The method of claim 9 wherein said video image selection means comprises a remote control device.

* * * * *